(12) United States Patent
Peralta et al.

(10) Patent No.: US 12,437,673 B2
(45) Date of Patent: Oct. 7, 2025

(54) SYSTEM AND METHOD FOR BIDIRECTIONAL AUTOMATIC SIGN LANGUAGE TRANSLATION AND PRODUCTION

(71) Applicant: SAMSUNG ELECTRONICS CO., LTD., Suwon-si (KR)

(72) Inventors: Daryl Luciano Peralta, Metro Manila (PH); Shakira Arguelles, Rizal (PH); Williard Joshua Decena Jose, Metro Manila (PH)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 309 days.

(21) Appl. No.: 18/101,904

(22) Filed: Jan. 26, 2023

(65) Prior Publication Data
US 2023/0316952 A1 Oct. 5, 2023

Related U.S. Application Data

(63) Continuation of application No. PCT/KR2023/000115, filed on Jan. 4, 2023.

(30) Foreign Application Priority Data
Apr. 4, 2022 (PH) .............................. 12022050141

(51) Int. Cl.
G09B 21/00 (2006.01)
G06T 9/00 (2006.01)
(Continued)

(52) U.S. Cl.
CPC ............. *G09B 21/009* (2013.01); *G06T 9/00* (2013.01); *G06T 13/40* (2013.01); *G10L 13/00* (2013.01)

(58) Field of Classification Search
CPC ............ G06T 9/00; G06T 13/40; G06N 20/00
See application file for complete search history.

(56) References Cited

U.S. PATENT DOCUMENTS

10,089,901 B2 10/2018 Jung et al.
10,289,903 B1* 5/2019 Chandler .............. G06F 18/214
(Continued)

FOREIGN PATENT DOCUMENTS

CN 110677639 A 1/2020
CN 108256458 B 8/2020
(Continued)

OTHER PUBLICATIONS

Camgoz et al. "Sign Language Transformers: Joint End-to-end Sign Language Recognition and Translation". arXiv:2003.13830v1 [cs.CV] Mar. 30, 2020 (Year: 2020).*
(Continued)

*Primary Examiner* — Jesse S Pullias
(74) *Attorney, Agent, or Firm* — CANTOR COLBURN LLP (57) ABSTRACT

An embodiment relates to a system and method for bidirectional automatic sign language translation and visualization. of the system includes at least two communication-capable devices for receiving and processing information from the system's input and/or output and showing the output of the system. At least two individuals are communicating with each other, both using different modes of communication such as sign language and spoken language. The individuals are able to utilize two separate computing devices, with the system installed or disposed, to translate the information the individuals are signing.

6 Claims, 10 Drawing Sheets

(51) Int. Cl.
*G06T 13/40* (2011.01)
*G10L 13/00* (2006.01)

(56) References Cited

U.S. PATENT DOCUMENTS

| | | | |
|---|---|---|---|
| 10,902,219 B2 | 1/2021 | Natesan et al. | |
| 10,956,725 B2 | 3/2021 | Menefee et al. | |
| 2009/0012788 A1* | 1/2009 | Gilbert | G10L 21/06 704/235 |
| 2013/0204605 A1 | 8/2013 | Illgner-Fehns | |
| 2016/0042228 A1 | 2/2016 | Opalka et al. | |
| 2017/0236450 A1* | 8/2017 | Jung | G06F 3/167 704/3 |
| 2019/0138607 A1* | 5/2019 | Zhang | G06N 3/044 |
| 2019/0279529 A1* | 9/2019 | Al-Gabri | B25J 11/008 |
| 2020/0005028 A1* | 1/2020 | Gu | G10L 13/047 |
| 2020/0075011 A1 | 3/2020 | Yao | |
| 2020/0167556 A1* | 5/2020 | Kaur | G06F 3/0304 |
| 2021/0043110 A1* | 2/2021 | Jung | G10L 15/24 |
| 2021/0174034 A1* | 6/2021 | Retek | G06F 3/017 |

FOREIGN PATENT DOCUMENTS

| | | |
|---|---|---|
| JP | 2015169814 A | 9/2015 |
| JP | 2019124901 A | 7/2019 |
| JP | 2021196708 A | 12/2021 |
| KR | 20160109708 A | 9/2016 |
| KR | 102212298 B1 | 2/2021 |
| KR | 102318150 B1 | 10/2021 |
| KR | 102370993 B1 | 3/2022 |

OTHER PUBLICATIONS

International Search Report and Written Opinion for International Application No. PCT/KR2023/000115; International filing date Jan. 4, 2023; Date of Mailing Apr. 21, 2023; 9 Pages.

* cited by examiner

SYSTEM AND METHOD FOR BIDIRECTIONAL AUTOMATIC SIGN LANGUAGE TRANSLATION AND PRODUCTION

CROSS-REFERENCE TO RELATED APPLICATIONS

This application is a continuation of International Application No. PCT/KR2023/000115 designating the United States, filed on Jan. 4, 2023, and claiming priority to Philippines Patent Application No. PH12022050141, filed on Apr. 4, 2022, the disclosures of all of which are incorporated by reference herein in their entireties.

TECHNICAL FIELD

One or more embodiments of the present invention relate to an automated translation system. One or more embodiments of the present invention specifically relate to devices, methods, and systems in the automated sign language translation for mobile devices.

BACKGROUND OF THE INVENTION

In 2021, over 5% of the world (430 million people) need hearing loss rehabilitation. It is projected that by 2050, at least 700 million will have disabling hearing loss. It is believed that 80% of deaf people are illiterate or semi-literate.

Sign language is the primary medium of communication between hearing and non-hearing individuals, especially for those who are illiterate. However, commercially available applications have yet to adequately cover these communication needs.

Text is an alternative way of communication for the deaf and mute but most of them are illiterate or semi-literate. Parents with children who have hearing impairments lack tools to learn sign language quickly. Video conferencing applications do not have support for sign language users making remote work and classes more difficult for the deaf and mute.

Smart appliances still have limited support for gesture and sign language recognition in contrast to the availability of speech recognition systems for spoken language.

A great percentage of the deaf will likely have difficulties following written captions, and present systems for sign language translation does not address text to sign language with an appropriate context. This is due to the limited vocabulary and translations which focus only on hand motions, disregarding subtler contexts of sign language, and on per word or letter transactions.

Likewise, signs are only done by 3D avatars which miss out on details such as facial expressions and are prone to incorrect translations; usually these 3D avatars place a focus only on unidirectional translation.

A review of the prior art shows the technology relating to the translation of sign language in various mediums for communication purposes have been achieved. As an example, CN108256458 ('458) provides a two-way real-time translation system and method for deaf natural sign language, which can translate the deaf natural sign language into text and sound in real-time to enable a user to understand and can also translate the text in real-time by listening to spoken language.

As such, '458 discloses sensory inputs for pattern and gesture recognition are obtained from a motion collection device. The input sensory data are processed and subsequently processed and translated into other sign language outputs such as visual and audio outputs. Gesture recognition and formation of sentences from the obtained gestures are evaluated and estimated through machine learning methods such as a Markov model algorithm.

Technical Solutions

One or more embodiments of the present invention convert various sensory inputs to sign language related outputs (i.e., textual, visual, and auditory) for communication device users with high contextual accuracy by using advanced neural networks and improved machine learning capacities at real-time appropriate response.

In particular, one or more embodiments of the present invention use at least two methods, namely production and translation methods, for a robust and sophisticated processing of various of input sensory data. It is noted that '458 is silent regarding production and translation methods for processing sensory information from various inputs, while one or more embodiments can simultaneously train both sign language translation model and sign language production model using the output from each other.

SUMMARY OF THE INVENTION

According to one or more embodiments, the present invention relates to a system and method for bidirectional automatic sign language translation and visualization. One or more embodiments include at least two communication-capable devices for receiving and processing information from the system's input and/or output and for showing the output of the system. At least two (2) individuals communicate with each other, both using different modes of communication such as sign language and spoken language. The individuals utilize two (2) separate computing devices, with the system installed or disposed to translate the information the individuals are signing.

BRIEF DESCRIPTION OF THE FIGURES

The accompanying drawings, which are included to understand the present invention further, are incorporated herein to illustrate the embodiments of the present invention. Along with the description, they also explain the principle of the present invention and are not intended to be limiting. In the drawings.

DETAILED DESCRIPTION OF THE INVENTION

Figure 1:
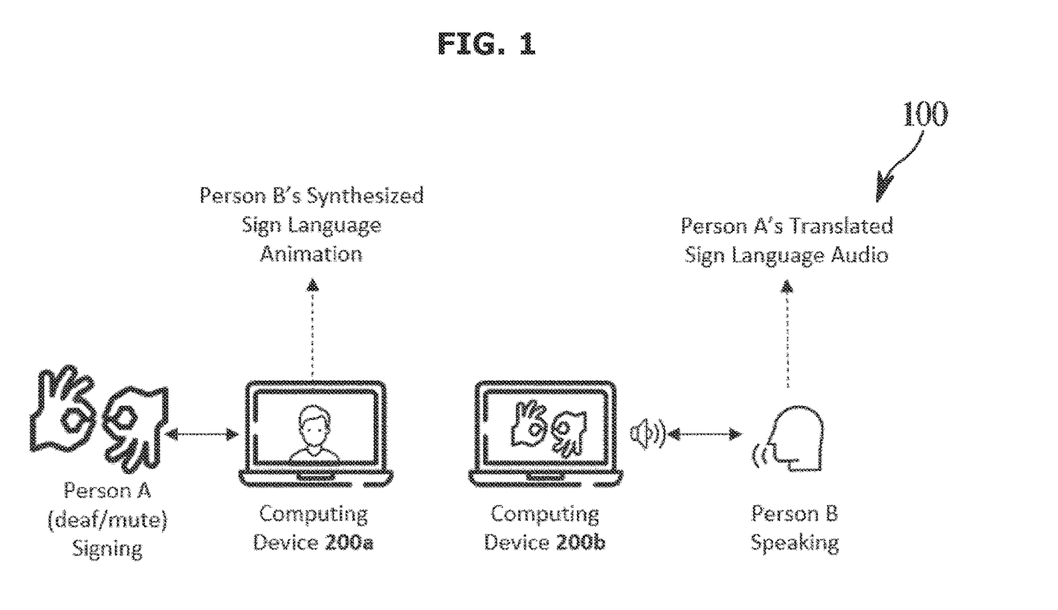
FIG. 1 illustrates a high-level example for the present system and method in its implementation according to one or more embodiments of the present invention.

Embodiments of the present invention relate to bidirectional automatic translation of sign language for use in smart devices. FIG. 1 illustrates a system and method for bidirectional sign language translation and production including at least two communication-capable devices that can receive and process information related to the system's input and/or output and that can show the output of the system.

FIG. 1 depicts two individuals communicating with each other, both using different languages: one in sign language, and another in spoken language. These two individuals can utilize two separate computing devices as communication-capable devices 200a and 200b, both of which have the modules of one or more embodiments of the invention installed or placed in it, to translate what the other party is signing or speaking.

System 100 includes communication-capable devices 200 (e.g., generally referring to communication-capable devices 200a and 200b) that can present the system output by making use of:

(a) at least one visual display (not shown); and/or
(b) at least one auditory display (not shown).

Figure 2:
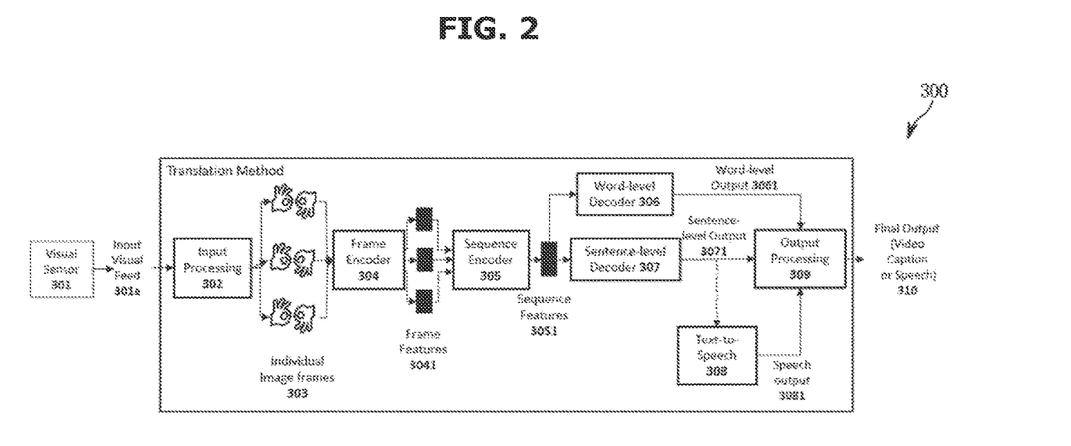
FIG. 2 illustrates a diagram detailing the translation method block according to one or more embodiments of the present invention.
Figure 3:
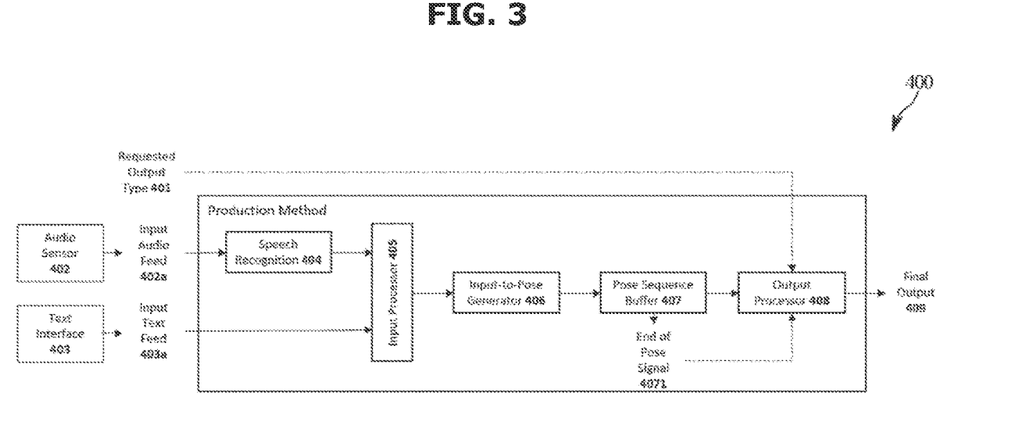
FIG. 3 illustrates a diagram detailing the production method block according to one or more embodiments of the present invention.

With reference to FIGS. 1, 2, and 3, system 100 includes communication-capable device 200a and communication-capable device 200b which are able to receive the system input by making use of at least one visual sensor 301 that is able to capture a range of motions that can be interpreted as sign language, at least one audio sensor 402 that is able to capture sound that can be interpreted as spoken vocabulary, and an interface 403 that is able to capture textual information that can be interpreted as written vocabulary. The operating method of one or more embodiments of the present invention include two blocks, namely, the translation block and the production block.

FIG. 2 details the translation block according to one or more embodiments. The translation method block 300 receives visual feed 301a from visual sensor 301 as individual image frames 303 and converts visual data in sign language into spoken language as output 310. Encoders are then used to process the input data by using Deep Neural Network (DNN) models, while decoders are used to generate world-level outputs such as text-to-speech mechanisms. The translation method converts visual data in sign language into spoken language.

Translation block 300 performs a sign language translation method which includes the following modules.

(a) An input processing module 302 receives the visual feed 301a and performs any, if necessary, pre-processing to the visual feed 301a.
(b) A frame encoder module 304 encodes individual image frames 303 from input processing module 302 into feature vectors (or feature vector representations) 3041.
(c) A sequence encoder module 305 encodes feature vectors 3041 from frame encoder module 304 into a feature vector capturing the whole meaning of the frame sequences 3051.
(d) A word-level decoder 306 decodes the words being signed in the video from the output of sequence encoder module 305.
(e) A sentence-level decoder 307 generates whole translated text 3071 from the output of sequence encoder module 305.
(f) A text-to-speech module 308 generates speech output 3081 from the output of sentence-level decoder 307.
(g) An output processing module 309 adjusts or packages the results from (d) to (f) to create video output 310 that can be displayed or generated in the device (e.g., communication-capable devices 200a and 200b) of the spoken language users.

Input processing module 302 performs processing of input data such as acquiring frames as batch input from the visual feed. Further, frame encoder module 304 encodes each image frame into feature representations using Deep Neural Network (DNN) models. Sequence encoder module 305 encodes the information from the whole sequence of frames using DNN. Word-level decoder 306 uses frame sequences (e.g., sequence features) 3051 to generate word-level output 3061. Word-level output 3061 also serves as additional feedback during training. Sentence-level decoder 307 uses frame sequences (e.g., sequence features) 3051 to generate word-level output 3061. Text-to-speech module 308 converts text into speech using DNN. Output processing module 309 performs additional processing on the output of the models before displaying or sending output 310.

It is understood that the input to translation block 300 is a visual feed or sign language. The process of the translation block 300 is the conversion from sign language to spoken language.

FIG. 3 details the production method block 400 according to one or more embodiments. Audio feed 402a is acquired from audio sensor 402. Audio feed is converted to text, patterns are identified in the text, and the data obtained is utilized to train DNN models to compile a sequence of poses and thus generate output media, such as photorealistic and/or animated videos by output processor module 408.

Production block 400 performs a sign language translation method as discussed below.

(a) A speech recognition module 404 interprets audio feed 402a acquired from audio sensor 402, if available.
(b) An input processor module 405 converts input feed 402a and/or 403a into a data format required for sign language generation (not shown).
(c) An input-to-pose generator module 406 creates a sequence of poses that when combined, appear to refer to the sign language translation of the input.
(d) A pose sequence buffer 407 acts as a temporary storage (not shown) for the sequence of poses being created.
(e) An optional end of pose generation signal 4071 can be used to inform the output processor module 408 either if the pose sequences have all been generated/consumed, or how many more sequences are remaining before the end of pose generation.

(f) An output processing module 408 adjusts or packages sign language poses to create output data 409 that may be displayed or presented in the device (e.g., communication-capable devices 200a and 200b) of the sign language users, where the display or presentation is according to requested output type 401.

The method where the input of production block 400 is a feed of spoken language, and optional information regarding what media or type the output is expected to be, herein referred to as request output type 401. The expected output of production block 400 is the conversion from spoken language to sign language.

The method where, in the absence of the request output type 401, final output 409 is a generated photorealistic video or video feed.

According to an exemplary embodiment of the present invention in FIGS. 1, 2, and 3, system 100 may also include communication-capable devices 200 being used specifically by sign language users in which the communication-capable devices 200 have at least the visual sensor 301 but can also have both audio sensor 402 and text interface 403. Likewise, system 100 can be used specifically by spoken language users, and communication-capable devices 200 of system 100 have at least audio sensor 402 or text interface 403 but can also have visual sensor 301.

In another exemplary embodiment of the present invention, system 100 includes communication-capable devices 200 being used specifically by sign language users in which communication-capable devices 200 may have a visual display (not shown) to display output 310 and/or output 409. Likewise, system 100 may be used specifically by spoken language users, and communication-capable devices 200 may include at least an auditory speaker (not shown) for auditory output and may also have the visual display to present output 310 and/or output 409.

Figure 4:
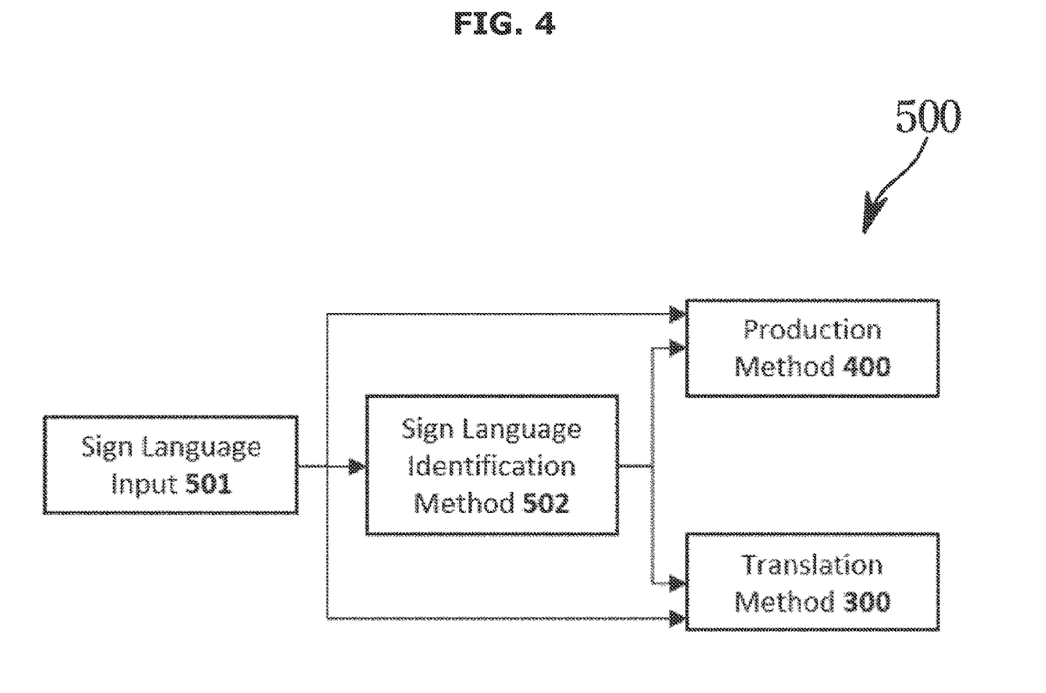
FIG. 4 illustrates a diagram depicting the identified sign language as an extra input to modules for the production and translation methods according to one or more embodiments of the present invention.

According to FIG. 4 of one or more embodiments of the present invention, sign language identification module 500 enables communication-capable devices (e.g., user device) 200 to take note of or save the following information including any information related to it, such as which languages the user typically signs in and which language the user typically requests translations for. Sign language input 501 is acquired and subsequently processed in sign language identification module 502. Processed data is then further inputted to production method block 400 and translation method block 300.

Figure 5:
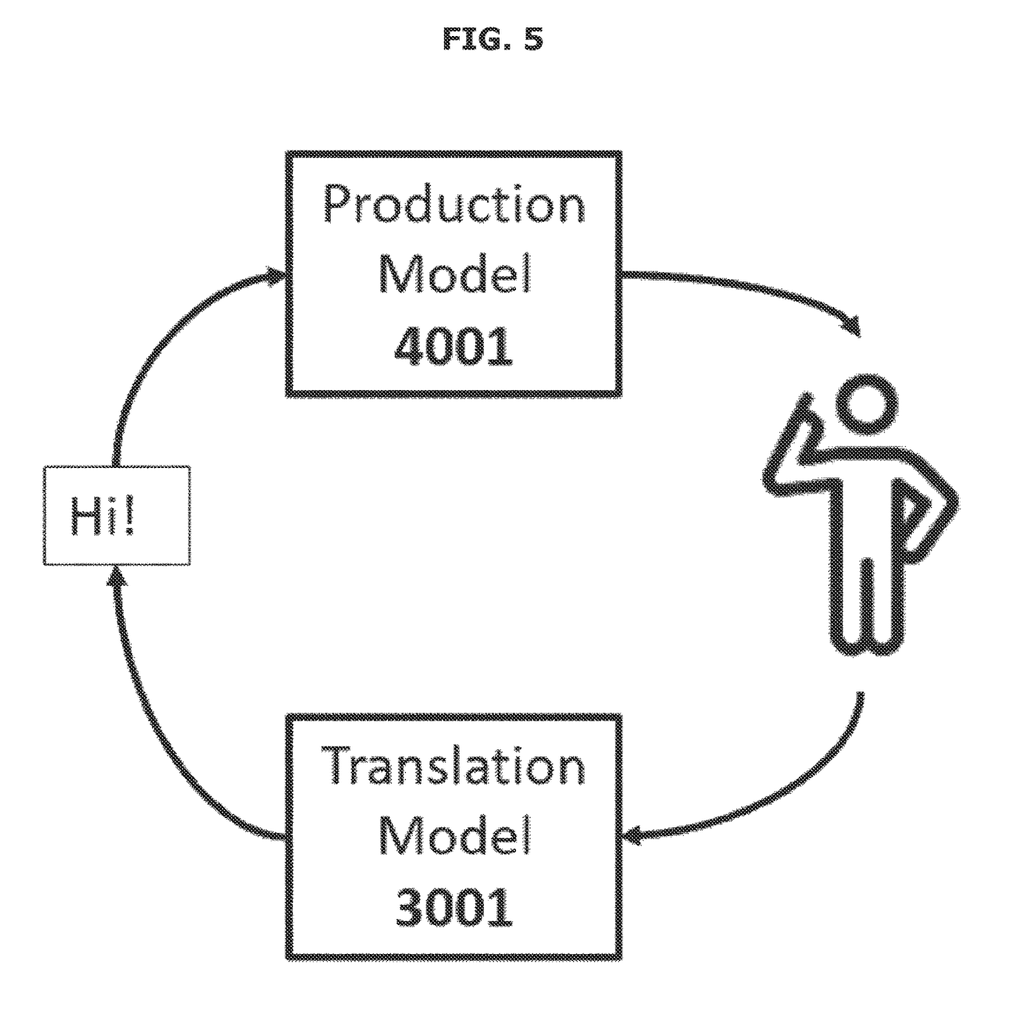
FIG. 5 illustrates bidirectional training of a translation model of the translation module and a production model of the production module for output consistency according to one or more embodiments of the present invention.

As shown in FIG. 5, the production and translation modules through production model 4001 and translation model 3001, respectively, are trained simultaneously using the output of the other models. Machine learning algorithms processed on a suitable processing system, such as the communication-capable devices discussed herein, are trained to result in the production model 4001 and the translation model 3001. The output of production model 4001 is utilized to train the translation model 3001 while the output of translation model 3001 simultaneously trains the production model 4001.

Figure 6:
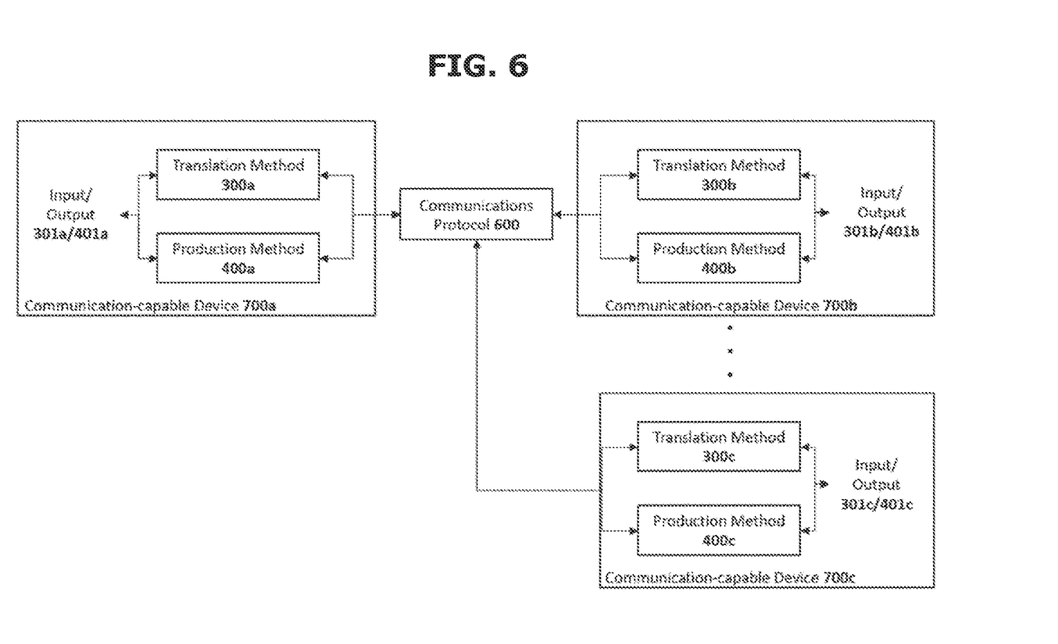
FIG. 6 illustrates a connection of user devices implementing the modules of the present invention according to one or more embodiments of the present invention.

FIG. 6 shows the communication of user devices as being used for the bi-directional translation of sign language. Output from translation block 300a and production method block 400a disposed on communication-capable device 700a, output from translation block 300b and production method block 400b disposed on communication-capable device 700b, and output from translation block 300c and production method block 400c disposed on communication-capable device 700c can be communicated through communication protocol 600. It can also be construed that communication between multiple communication-capable devices is possible.

Figure 7:
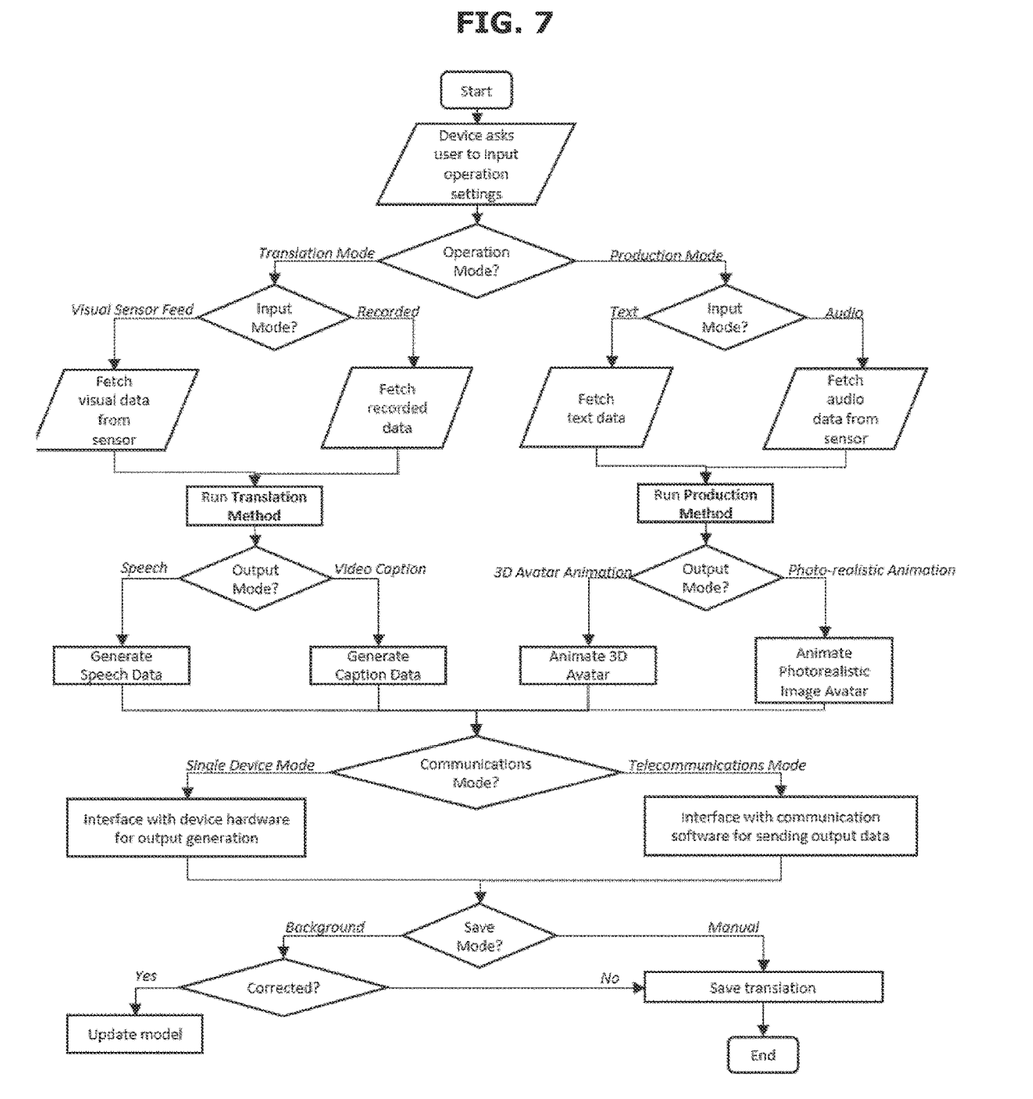
FIG. 7 illustrates a flowchart of a computer-implemented method according to one or more embodiments of the present invention.

The flowchart presents the method which is shown on FIG. 7. The method can operate based on multiple settings including the following.
  Translation mode
    Input
      Visual Sensor Feed
      Recorded (e.g., visual sensor feed)
    Output
      Speech audio
      Video caption.
  Production mode
    Input
      Text
      Speech audio
    Output
      3D avatar animation
      Photo-realistic animation
  Communication mode
    Telecommunications mode
    Single device mode.
  Save mode.
    Background
    Manual
    Do nothing According to an embodiment of the production method, speech recognition module 404 converts audio feed 402a into text, where speech recognition module 404 can be implemented by training and using a neural network.

Input processor module 405 performs any adjustments to text and recognized speech input into input that can be used by input-to-pose generator module 406. Input processor module 405 creates code for input transformation.

Input-to-pose generator module 406 creates a sequence of poses that pertain to the data discerned by the input processor module 405. Input-to-pose generator can be implemented by training and using a neural network. Input-to-pose generator module 406 feeds sequences of poses into pose sequence buffer 407. This is then used to train a neural network. Any body gestures and expression representation can be used.

Pose sequence buffer 407 compiles the sequence of poses from the generator block. It further creates codes to that are handled by pose sequence buffer 407. A possible data structure for pose sequence buffer 407 is a circular buffer.

End-of-pose signal 4071 informs output processor module 408 that the sequence is about to end and acts as a look-ahead. It further creates an end to any sequence signal from buffer 407 by checking if it is empty.

Output processor module 408 generates output 409 from the pose sequences based on the requested output type. Some of the possible options are:
  (a) Photorealistic video that can be generated by a neural network; and
  (b) 3D animated video that can be generated by programmatically creating code to link the pose sequences to a 3D animation/render program.

In an exemplary embodiment, the system can take feedback from users and introduce this feedback to its translation and production methods. When using a neural network implementation for the translation and production methods on communication-capable devices 200, this is called incremental learning. This is a learning paradigm that deals with streaming data, which can be helpful in cases where data is limited or can vary wildly such as in sign language.

Example 1

Figure 8:
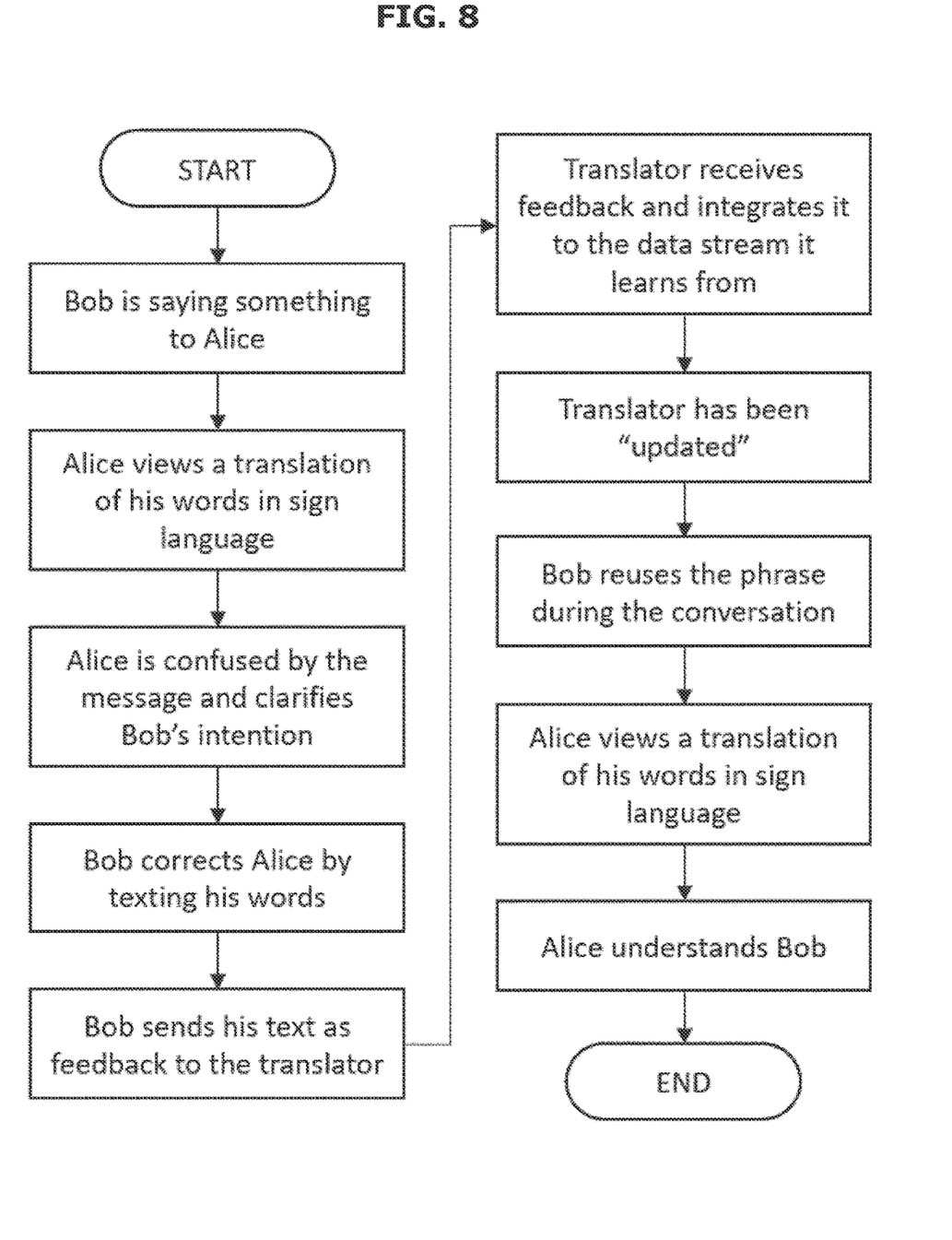
FIG. 8 illustrates an example scenario for the implementation of the bidirectional sign language translation method according to one or more embodiments of the present invention.

In this example scenario as shown in FIG. 8, a video call between two persons can be observed. Alice, a native signer, and Bob.

The sign language translation method may also include processes for translating sign language to another sign language. For example, translating American Sign Language to British, Australian, and New Zealand Sign Language. This can be done by utilizing the Production Method on both communication devices.

The translation blocks 300, 300*a*, 300*b*, 300*c* and the production blocks 400, 400*a*, 400*b*, and 400*c* all include computer-executable instructions (i.e., code) for execution on processors to function as discussed herein.

Figure 9:
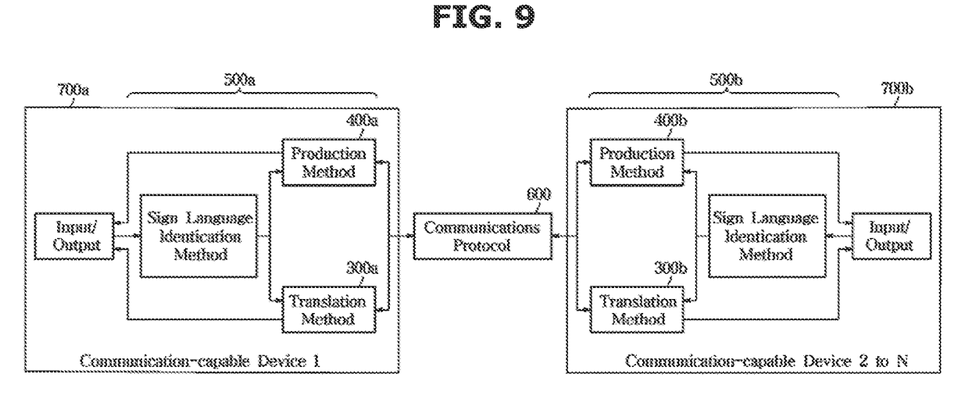
FIG. 9 illustrates the communication of user devices used for the bi-directional translation of sign language according to one or more embodiments of the present invention.

FIG. 9 shows the communication of user devices (e.g., communication-capable devices) being used for the bi-directional translation of sign language. Output from sign language identification block 500*a* and production method block 400*a* disposed on communication-capable device 700*a*, and sign language identification block 500*b* and production method block 400*b* disposed on communication-capable device 700*b* are communicated through communication protocol 600. It is also preferred (but not a necessity) that language utilized by communication-capable devices 700*a* and 700*b* is automatically identified through sign language identification blocks 500*a* and 500*b*. It can also be construed that communication between multiple communication-capable devices is possible. Further, any data about the identified language is sent along with the other possible system input.

In one or more embodiments, the machine learning models can include various engines/classifiers and/or can be implemented on a neural network. The features of the engines/classifiers can be implemented by configuring and arranging a computer system to execute machine learning algorithms. In general, machine learning algorithms, in effect, extract features from received data in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

Training datasets can be utilized to train the machine learning algorithms. Labels of options/suggestions can be applied to training datasets to train the machine learning algorithms, as part of supervised learning. For the preprocessing, the raw training datasets may be collected and sorted manually. The sorted dataset may be labeled (e.g., using a labeling tool such). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model. Once the model is trained, the model (including the adjusted weights) is saved to a file for deployment and/or further testing on the test dataset.

The communication-capable devices include processors and computer-executable instructions stored in memory, and the computer-executable instructions are executed by the processors according to one or more embodiments. One or more of the various components, modules, engines, etc., described herein can be implemented as computer-executable instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the modules described herein can be a combination of hardware and programming. The programming can be processor executable instructions stored on a tangible memory, and the hardware can include processing circuitry for executing those instructions. Thus, a system memory can store program instructions that when executed by processing circuitry implement the modules described herein. Alternatively, or additionally, the modules can include dedicated hardware, such as one or more integrated circuits, ASICs, application specific special processors (ASSPs), field programmable gate arrays (FPGAs), or any combination of the foregoing examples of dedicated hardware, for performing the techniques described herein.

Figure 10:
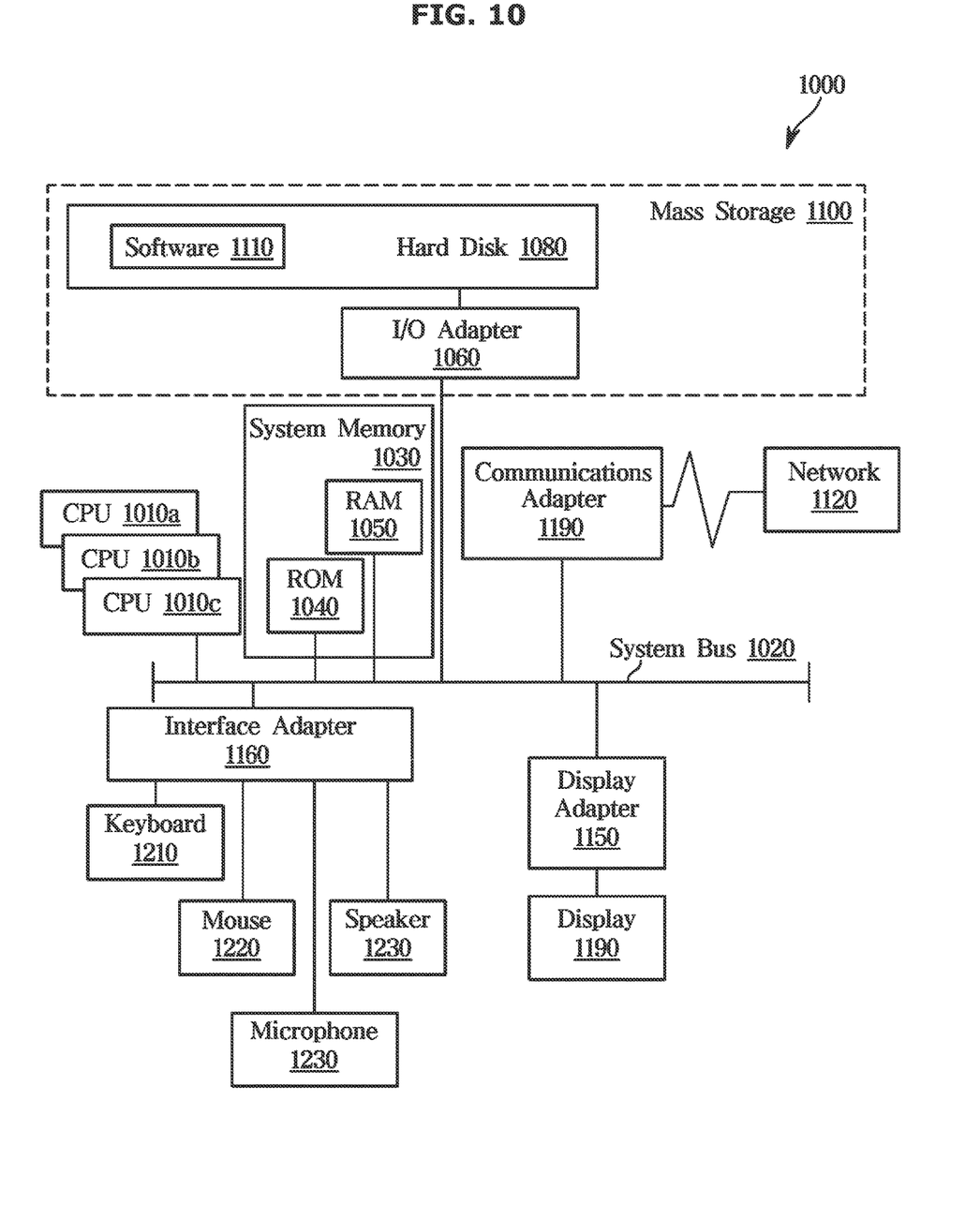
FIG. 10 illustrates an example computer system that can be utilized according to one or more embodiments of the present invention.

Any of the computers, computer systems, and communication-capable devices discussed herein can include any of the functionality in FIG. 10. Turning now to FIG. 10, a computer system 1000 is generally shown in accordance with one or more embodiments. The computer system 1000 can be an electronic, computer framework comprising and/or employing any number and combination of computing devices and networks utilizing various communication technologies, as described herein. The computer system 1000 can be easily scalable, extensible, and modular, with the ability to change to different services or reconfigure some features independently of others. The computer system 1000 may be, for example, a server, desktop computer, laptop computer, tablet computer, or smartphone. In some examples, computer system 1000 may be a cloud computing node. Computer system 1000 may be described in the general context of computer system executable instructions, such as program modules, being executed by a computer system. Generally, program modules may include routines, programs, objects, components, logic, data structures, and so on that perform particular tasks or implement particular abstract data types. Computer system 1000 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system 1000 has one or more central processing units (CPU(s)) 1010*a*, 1010*b*, 1010*c*, etc., (collectively or generically referred to as processor(s) 1010). The processors 1010 can be a single-core processor, multi-core processor, computing cluster, or any number of other configurations. The processors 1010, also referred to as processing circuits, are coupled via a system bus 1020 to a system memory 1030 and various other components. The system memory 1030 can include a read only memory (ROM) 1040 and a random access memory (RAM) 1050. The ROM 1040 is coupled to the system bus 1020 and may include a basic input/output system (BIOS) or its successors like Unified Extensible Firmware Interface (UEFI), which controls certain basic functions of the computer system 1000. The RAM is read-write memory coupled to the system bus 1020 for use by the processors 1010. The system memory 1030 provides temporary memory space for operations of said instructions during operation. The system memory 1030 can include random access memory (RAM), read only memory, flash memory, or any other suitable memory systems.

The computer system 1000 includes an input/output (I/O) adapter 1060 and a communications adapter 1070 coupled to the system bus 1020. The I/O adapter 1060 may be a small computer system interface (SCSI) adapter that communicates with a hard disk 1080 and/or any other similar component. The I/O adapter 1060 and the hard disk 1080 are collectively referred to herein as a mass storage 1100.

Software 1110 for execution on the computer system 1000 may be stored in the mass storage 1100. The mass storage 1100 is an example of a tangible storage medium readable by the processors 1010, where the software 1110 is stored as instructions for execution by the processors 1010 to cause the computer system 1000 to operate, such as is described herein below with respect to the various Figures. Examples of computer program product and the execution of such instruction are discussed herein in more detail. The communications adapter 1070 interconnects the system bus 1020 with a network 1120, which may be an outside network, enabling the computer system 1000 to communicate with other such systems. In one embodiment, a portion of the system memory 1030 and the mass storage 1100 collectively store an operating system, which may be any appropriate operating system to coordinate the functions of the various components shown in FIG. 10.

Additional input/output devices are shown as connected to the system bus 1020 via a display adapter 1150 and an interface adapter 1160. In one embodiment, the adapters 1060, 1070, 1150, and 1160 may be connected to one or more I/O buses that are connected to the system bus 1020 via an intermediate bus bridge (not shown). A display 1190 (e.g., a screen or a display monitor) is connected to the system bus 1020 by the display adapter 1150, which may include a graphics controller to improve the performance of graphics intensive applications and a video controller. A keyboard 1210, a mouse 1220, a speaker 1230, a microphone 1232, etc., can be interconnected to the system bus 1020 via the interface adapter 1160, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 10, the computer system 1000 includes processing capability in the form of the processors 1010, and storage capability including the system memory 1030 and the mass storage 1100, input means such as the keyboard 1210, the mouse 1220, and the microphone 1232, and output capability including the speaker 1230 and the display 1190.

In some embodiments, the communications adapter 1070 can transmit data using any suitable interface or protocol, such as the internet small computer system interface, among others. The network 1120 may be a cellular network, a radio network, a wide area network (WAN), a local area network (LAN), or the Internet, among others. An external computing device may connect to the computer system 1000 through the network 1120. In some examples, an external computing device may be an external webserver or a cloud computing node.

It is to be understood that the block diagram of FIG. 1 is not intended to indicate that the computer system 1000 is to include all of the components shown in FIG. 1. Rather, the computer system 1000 can include any appropriate fewer or additional components not illustrated in FIG. 1 (e.g., additional memory components, embedded controllers, modules, additional network interfaces, etc.). Further, the embodiments described herein with respect to computer system 1000 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

In accordance with the various embodiments, communication among system components may be via any transmitter or receiver used for Wi-Fi, Bluetooth, infrared, radio frequency, NFC cellular communication, visible light communication, Li-Fi, WiMAX, ZigBee, fiber optics, and other forms of wireless communication devices. Alternatively, communication may also be via a physical channel such as a USB cable or other forms of wired communication.

Computer software programs and algorithms—those including machine learning and predictive algorithms—may be written in any of various suitable programming languages, such as C, C++, C #, Pascal, Fortran, Perl, MATLAB (from MathWorks, www.mathworks.com), SAS, SPSS, JavaScript, CoffeeScript, Objective-C, Objective-J, Ruby, Python, Erlang, Lisp, Scala, Clojure, and Java. The computer software programs may be independent applications with data input and data display modules. Alternatively, the computer software programs may be classes that may be instantiated as distributed objects. The computer software programs may also be component software such as Java Beans (from Oracle) or Enterprise Java Beans (EJB from Oracle).

Furthermore, application modules or modules as described herein may be stored, managed, and accessed by an at least one computing server. Moreover, application modules may be connected to a network and interface to other application modules. The network may be an intranet, internet, or the Internet, among others. The network may be a wired network (e.g., using copper), telephone network, packet network, optical network (e.g., using optical fiber), or a wireless network or any combination of these. For example, data and other information may be passed between the computer and components (or steps) of a system useful in practicing the systems and methods in this application using the wireless network employing a protocol such as Wi-Fi (IEEE standards 802.12, 802.12a, 802.12b, 802.12e, 802.12g, 802.12i, and 802.12n, just to name a few examples). For example, signals from a computer may be transferred, at least in part, wirelessly to components or other computers.

It is contemplated for embodiments described herein to extend to individual elements and concepts described herein, independently of other concepts, ideas or system, as well as for embodiments to include combinations of elements recited anywhere in this application. It is to be understood that the invention is not limited to the embodiments described in detail herein with reference to the accompanying drawings. As such, many variations and modifications will be apparent to practitioners skilled in this art. Illustrative embodiments such as those depicted refer to a preferred form but is not limited to its constraints and is subject to modification and alternative forms. Accordingly, it is intended that the scope of the invention be defined by the following claims and their equivalents. Moreover, it is contemplated that a feature described either individually or as part of an embodiment may be combined with other individually described features, or parts of other embodiments, even if the other features and embodiments make no mention of the said feature. Hence, the absence of describing combinations should not preclude the inventor from claiming rights to such combinations.

The invention claimed is:

1. A system for bidirectional automatic sign language translation and production, the system comprising:
   at least one communication-capable device in communication with another communication-capable device;
   at least one visual sensor disposed on the at least one communication-capable device for acquiring input visual feed;
   at least one audio sensor disposed on the at least one communication-capable device for acquiring input audio feed;
   at least one text interface disposed on the at one least communication-capable device for acquiring input text feed;
   the at least one communication-capable device further comprising:
     at least one visual display; and
     at least one auditory display;
   a translation block for processing the input visual feed, the translation block comprising:
     an input processing module;
     a frame encoder in communication with the input processing module;
     a sequence encoder in communication with the frame encoder;
     a word-level decoder in communication with the sequence encoder;
     a sentence-level decoder in communication with the sequence encoder;
     a text-to-speech module in communication with the sentence-level decoder; and
     a first output processor in communication with the word-level decoder, the sentence-level decoder, and the text-to-speech module;
   a production block for processing the audio feed and text feed, the production block comprising:
     a speech recognition module;
     an input processor in communication with the speech recognition module;
     an input-to-pose generator in communication with the input processor the input-to-pose genera of figured to e f poses;
     a pose sequence buffer in communication with the input-to-pose generator, the pose sequence buffer being configured to store the sequence of poses, check when the pose sequence buffer is empty, and generate an end-of-pose signal indicating an end of the sequence of poses in the pose sequence buffer; and
     a second output processor in communication with the pose sequence buffer to receive the sequence of poses, the second output processor being configured to receive the end-of-pose signal;
   wherein a production model in the production block and a translation model in the translation block are trained simultaneously by machine learning methods.

2. The system according to claim 1, wherein the production block comprises a sign language identification method module for language identification.

3. The system according to claim 1, wherein the at least one communication-capable device is in communication with the another communication-capable device through a communication protocol.

4. The system according to claim 1, wherein a first output from the production model trains the translation model while a second output from the translation model trains the production model.

5. A method for bidirectional automatic sign language production, the method comprising:
   receiving an audio feed;
   converting the received audio feed into another data format for a sign language;
   generating a sequence of poses to refer to the sign language having been translated from the audio feed;
   storing the sequence of poses in a pose sequence buffer, wherein a check is performed to determine when the pose sequence buffer is empty, and wherein an end-of-pose signal is generated to indicate an end of the sequence of poses in the pose sequence buffer; and
   displaying the sequence of poses as the sign language;
   wherein machine learning methods are utilized to optimize generating the sequence of poses.

6. The method according to claim 5, wherein the sequence of poses comprises photorealistic videos, 3D animated videos, or a combination of the photorealistic videos and the 3D animated videos.

* * * * *